United States Patent [19]

Benscoter

[11] Patent Number: 4,638,115

[45] Date of Patent: Jan. 20, 1987

[54] THREE SERVICE AFTERSET

[75] Inventor: Richard D. Benscoter, Vienna, W. Va.

[73] Assignee: Butler Manufacturing Company, Kansas City, Mo.

[21] Appl. No.: 853,702

[22] Filed: Apr. 18, 1986

Related U.S. Application Data

[63] Continuation of Ser. No. 685,030, Dec. 21, 1984, abandoned.

[51] Int. Cl.$^4$ ............................................. H02G 3/08
[52] U.S. Cl. ................................................... 174/48
[58] Field of Search ..................... 174/48, 49; 52/221

[56] References Cited

U.S. PATENT DOCUMENTS

| | | | |
|---|---|---|---|
| 3,701,837 | 10/1972 | Fork | 174/49 X |
| 4,096,347 | 6/1978 | Penczak et al. | 174/48 |
| 4,465,897 | 8/1984 | Albrecht | 174/48 |
| 4,536,612 | 8/1985 | Domigan | 174/48 |

Primary Examiner—Laramie E. Askin
Assistant Examiner—David A. Tone
Attorney, Agent, or Firm—Frederick J. Olsson

[57] ABSTRACT

An afterset for a cellular raceway. The afterset includes an annular housing, an adjusting ring mounted in the housing, and a split cover for flush mounting removably secured to the adjusting ring. The housing has an internal bridge member which, in conjunction with the housing, forms a pair of power compartments open to the power cell of the cellular raceway and a pair of communication openings respectively open to the communication cells of the raceway, each power compartment has a duplex receptacle disposed below the cover and is accessible from the interior of the housing.

5 Claims, 4 Drawing Figures

THREE SERVICE AFTERSET

This application is a continuation of application Ser. No. 685,030, filed Dec. 21, 1984, now abandoned.

This invention in general relates to electrical in-floor power and communication distribution systems for office buildings and the like.

More particularly, the invention relates to a three-service afterset to be mounted over a cellular raceway to provide the means for bringing conductors in the cells out to the floor surface.

One advantage of the invention is that the design permits the components to be molded and die cast in essentially finished form to thereby greatly reduce cost.

Another advantage is that the low cost unit incorporates all of the features desired in aftersets, namely: flush mounted on the floor; adequate capacity for power and telephone/data conductors; and a pair of inside duplex receptacles.

The invention will be described below in connection with the following drawings wherein.

The afterset includes a hollow housing 2, an adjusting ring 3, and a split cover 4.

The afterset as shown is adapted to be positioned over a cellular raceway having a power cell and a pair of communications cells respectively on opposite sides thereof and with the crests of the cells essentially coplanar. When the concrete is drilled to provide the space for the afterset, the drilling operation cuts into the crests of the cells. When the concrete and the cut sections of metal are removed each of the three crests has an access opening.

Figure 1:
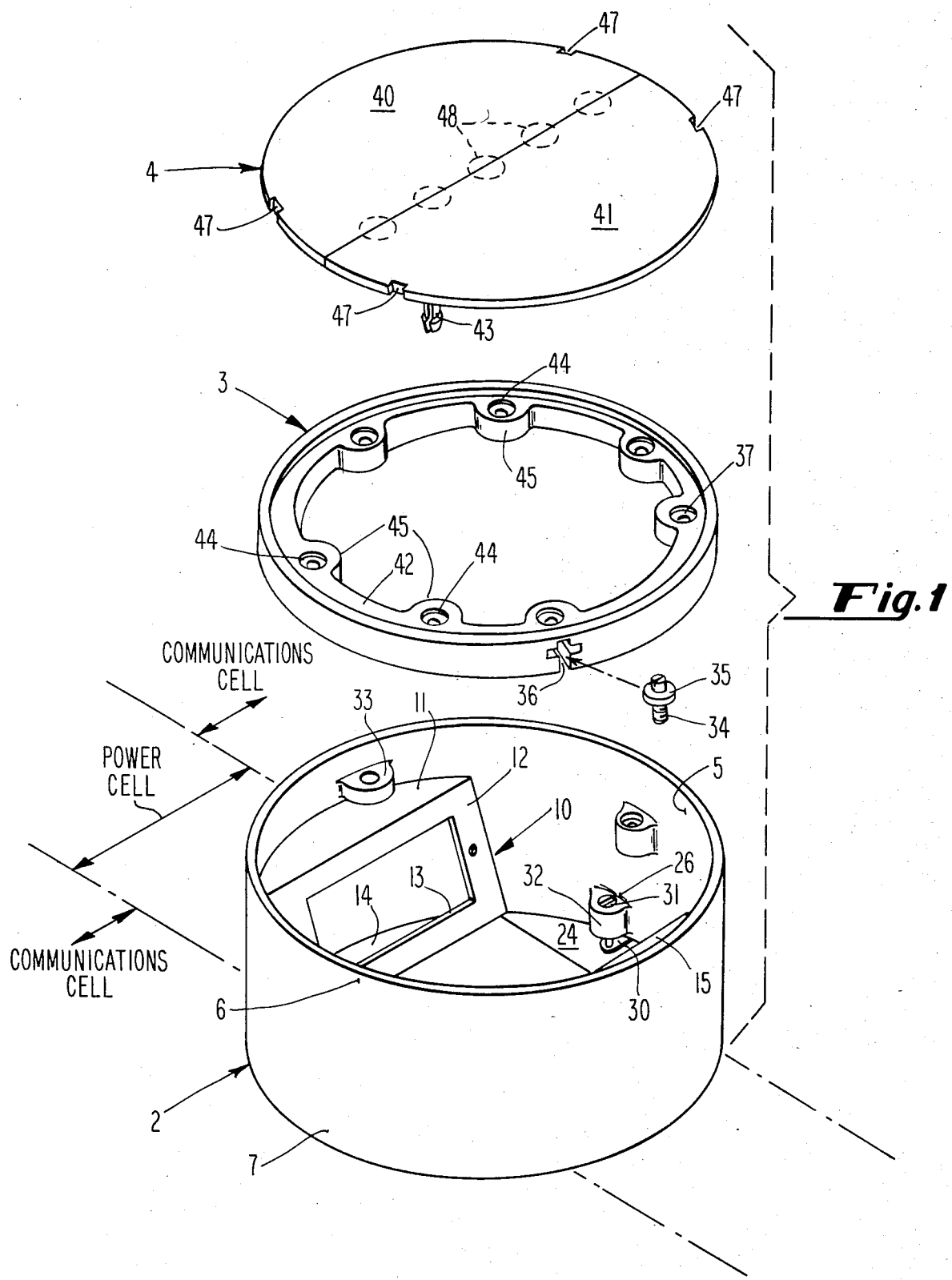
FIG. 1 is an exploded view of certain components to form a three service afterset.
Figure 3:
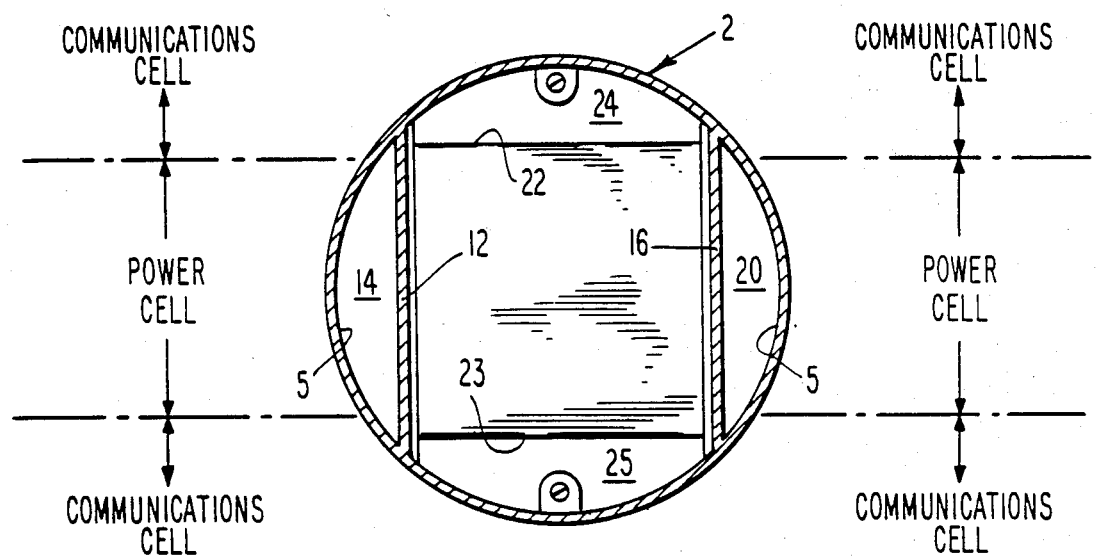
FIG. 3 is a reduced plan view taken along the lines 3—3 of FIG. 2.

In FIGS. 1 and 3 I have used dotted lines and the corresponding descriptive terms to indicate the general location of the power and communication cells.

The housing 2 is annular in shape with an inner wall 5, top end 6, and bottom end 7 and a bridge member 10 inside the body and extending diametrically across the same.

The bridge member 10 will now be explained. A first top 11 is connected to the inner wall 5 adjacent to the top end 6. A first receptacle mounting plate 12 is connected to the first top 10 and extends down toward the bottom end 7. The first receptacle mounting plate 12 is formed with an opening 13 to receive a receptacle.

Figure 2:
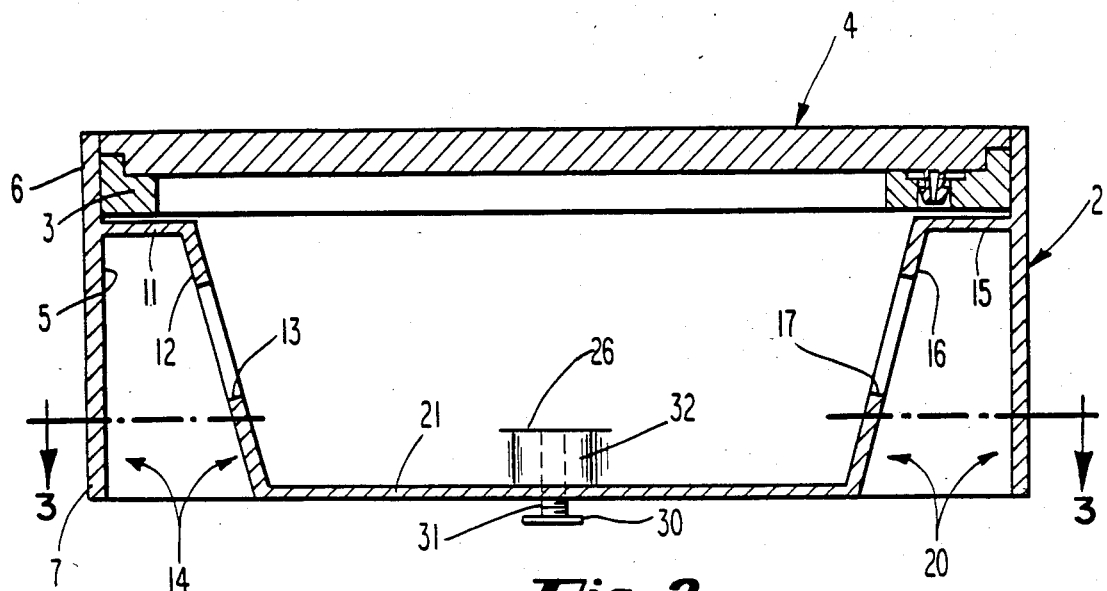
FIG. 2 is a sectional elevational view with the components of FIG. 1 in assembled condition 3—3 of FIG. 1.

With reference to FIGS. 2 and 3 it will be observed that the first top 11, the inner wall 5, and the first receptacle mounting plate 12 form a first hollow power compartment 14. This compartment 14 is adapted to be disposed over the access opening in the crest of a power cell indicated in FIG. 3.

A second top 15 is connected to the inner wall 5 adjacent to the top end 6. A second receptacle mounting plate 16 is connected to the second top 15 and extends down toward the bottom end 7. The second receptacle mounting plate 12 is formed with an opening 17 to receive a receptacle.

With reference to FIGS. 2 and 3 it will be observed that the second top 15, the inner wall 5, and the second receptacle mounting plate 16 form a second hollow power compartment 20. The compartment 20 is adapted to be disposed over the access opening in the crest of a power cell as indicated in FIG. 3.

A generally rectangular shaped bottom cover 21 is disposed between the lower ends of the receptacle mounting plates. One pair of opposite edges of the bottom cover 21 are respectively connected to the lower ends of the receptacle mounting plates (FIG. 2). The other pair of opposite edges 22 and 23 (FIG. 3) are spaced from the inner wall 5 and respectively form first and second communication openings 24 and 25 which are disposed over and open to the communications cells. The cover 21 electrically isolates the housing interior from the power cell.

On the bottom end 7 of the housing 2 are a pair of clamp means one of which is indicated at 26. The clamps are of the type shown in C. T. Flachbarth U.S. Pat. No. 3,322,442. The clamp has a foot 30 mounted on screw 31 rotatably mounted on the boss 32. When the screw is rotated in one direction the foot can be rotated inside the housing 2 and when rotated in the opposite direction can be rotated to extend radially outwardly and underneath the crest of the cell to which the afterset is connected.

On the inside wall are a plurality of bosses or supports 33. Each support 33 is internally threaded to receive an adjusting screw such as screw 34 which has a flange 35. The screws fit into the capture slots such as slot 36 in the adjusting ring 3 and the turn-slots in the screws are accessible from the top of the ring through apertures such as aperture 37.

The adjusting ring 3 carries the split cover 4 having sections 40 and 41 which fit into the ledge 42 of the ring. In the embodiment shown, the cover sections 41 and 42 and the studs thereof are molded of plastic material.

The cover sections are removably held on the adjusting ring by yieldable retaining studs (see stud 43) which are received in retaining apertures 44 formed in bosses 45 on the ring 3. Each retaining aperture has a retaining shoulder 44a.

Figure 4:
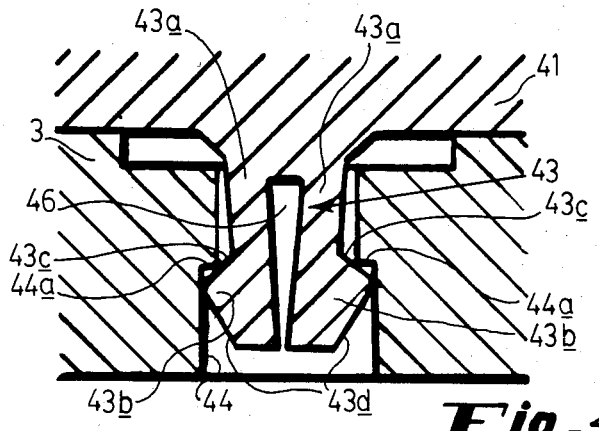
FIG. 4 is side elevational view of a cover retaining stud.

FIG. 4 illustrates the operation of the retaining studs 43. The stud has a center or axial slot 46 which forms opposite yieldable legs 43a. Each stud has a double tapered head 43b which is made elliptical in cross section and has top and bottom tapered sections 43c and 43d. The yieldable legs, the elliptical cross section, and the bottom tapered section 43d allow the stud to be pushed down into the retaining aperture and for the top taper 43c to snap under the shoulder 44a. For removal purposes, each of the cover sections 40 and 41 are provided with pry-out slots 47, the top tapered section 43c facilitating the pryout.

For the exit of conductors from the afterset, the cover sections 41 and 42 are each provided with knockouts indicated by the dotted lines 48.

In the embodiment shown, the bottom end 7 is formed so that all portions are coplanar. With this construction the afterset is adapted to be used on cellular raceways with the top surfacing which is flat. It will be understood that the bottom end may be formed as by contours to conform to the shape of a non-flat top surface on a cellular raceway.

The design provides for the housing 2 and adjusting ring 3 to be die cast and the cover sections 40 and 41 to be molded. In this way, the parts are in finished condition except that the threads in the bosses 37 are tapped.

I claim:

1. A three service afterset to be disposed over cellular raceway means having a power cell and communications cells located on opposite sides thereof with each cell having an access opening in the crest thereof, the afterset comprising:

an annular shaped, hollow housing having an inner wall, a top end, and a bottom end;

a first top connected to said inner wall adjacent said top end and extending outwardly from the inner wall, a first receptacle mounting plate connected to the first top and extending toward said bottom end and the first receptacle plate having an opening to receive a receptacle;

said first top, said inner wall and said first receptacle mounting plate forming a first hollow power compartment to be disposed over the access opening in said power cell;

a second top connected to the inner wall adjacent said top end at a position diametrically opposite to the first top and extending outwardly from the inner wall, and a second receptacle mounting plate connected to the second top and extending toward said bottom end and the second receptacle mounting plate having an opening to receive a receptacle;

said second top, said inner wall, and said second receptacle mounting plate forming a second hollow power compartment to be disposed over the access opening in said power cell;

a bottom cover having a first pair of opposite edges and a second pair of opposite edges, the bottom cover being disposed between the lower ends of said first and second receptacle plates and the first pair of opposite edges of the bottom cover being connected respectively to the lower ends of said first and second mounting receptacle plates and the second pair of opposite edges each being spaced from said inner wall; and said inner wall and each edge of said second pair of opposite edges forming first and second communications openings to be respectively disposed over the access openings in said communications cells.

2. A three service afterset to be disposed over cellular raceway means having a power cell and communications cells located on opposite sides of the power cell with each cell having an access opening in the crest thereof, the afterset comprising:

an annular shaped, hollow housing having an inner wall, a top end, and a bottom end;

a first top disposed inside said housing and connected to said inner wall adjacent said top end and extending outwardly from the inner wall;

a first receptacle mounting plate connected to said first top and extending toward said bottom end and the first receptacle plate having an opening to receive a receptacle;

said first top, said inner wall, and said first receptacle mounting plate forming a first hollow power compartment to be disposed over the access opening in said power cell;

a second top disposed inside said housing and connected to the inner wall adjacent said top end at a position diametrically opposite to said first top and extending outwardly form the inner wall;

a second receptacle mounting plate connected to said second top and extending toward said bottom end and the second receptacle mounting plate having an opening to receive a receptacle;

said second top, said inner wall, and said second receptacle mounting plate forming a second hollow power compartment to be disposed over the access opening in said power cell; and cover means extending between the lower ends of said first and second receptacle plates for providing a cover on the power cell and opposite side of the cover means being spaced from said inner wall to provide first and second communications openings for said communication cells.

3. The afterset of claim 2 further including:

support means on said inner wall adjacent said top end;

an adjusting ring disposed above said support means the ring having two pair of cover-retaining apertures and three threaded apertures;

three adjusting screws respectively threaded in said threaded apertures and mounting said adjusting ring on said support means;

a pair of covers disposed on said adjusting ring within the confines of said housing; and on each cover, a pair of yieldable retaining studs respectively disposed in said pairs of cover retaining apertures.

4. For a cellular raceway having a central power cell and a pair of communication cells respectively on opposite sides of the power cell, a three-service afterset for serving the power and communication cells, comprising:

an annular housing;

an adjusting ring mounted in the housing;

cover means mounted on said adjusting ring;

a bridge member having a pair of end portions and a cover portion therebetween, the bridge member being disposed below said adjusting ring and extending diametrically across the interior of the housing with the end portions respectively being connected to the housing;

one end portion of said bridge member and the inner wall of the housing forming a first hollow power compartment having means for mounting a first power receptacle, the hollow first power compartment being adapted to be disposed over and open to an access opening in a power cell;

the other end portion of the bridge member and the inner wall of the housing forming a second hollow power compartment having means for mounting a second receptacle, the hollow second power compartment being adapted to be disposed over and open to said power cell access opening in said power cell; and the cover portion having opposite edges spaced from the inner wall of the housing, the inner wall and said edges respectively forming first and second communication openings adapted to be disposed over and open to access openings in said communication cells and the cover portion being adapted to cover said power cell access opening to provide electrical isolation as between the power cell and the communication cells.

5. For a cellular raceway having a central power cell and a pair of communication cells respectively on opposite sides of the power cell, a three-service afterset for serving the power and communication cells comprising:

an annular housing having a top and a bottom;

a bridge member inside of the housing and extending diametrically across the housing, the bridge member having a pair of end portions and a cover portion therebetween, the cover portion being disposed adjacent said bottom and the end portions being connected to the housing adjacent the top thereof, each end portion configured to form, respectively, in combination with the inner wall of the housing a pair of hollow power compartments each for mounting a power receptacle and the cover of the bridge member being configured to form, in conjunction with the inner wall of the housing, a pair of communication openings; and said hollow power compartments being adapted to be disposed over and open to an access opening in the power cell, said communication openings being adapted to be disposed over and open resepectively to access openings in said communication cells, and said cover portion being adapted to cover said power cell access opening to provide electrical isolation as between the power cell and communication cells.

* * * * *